V. DREWSEN.
PROCESS FOR UTILIZING PYRITES FOR BISULFITE OF LIME MANUFACTURE, &c.
APPLICATION FILED DEC. 9, 1909.
981,625.
Patented Jan. 17, 1911.
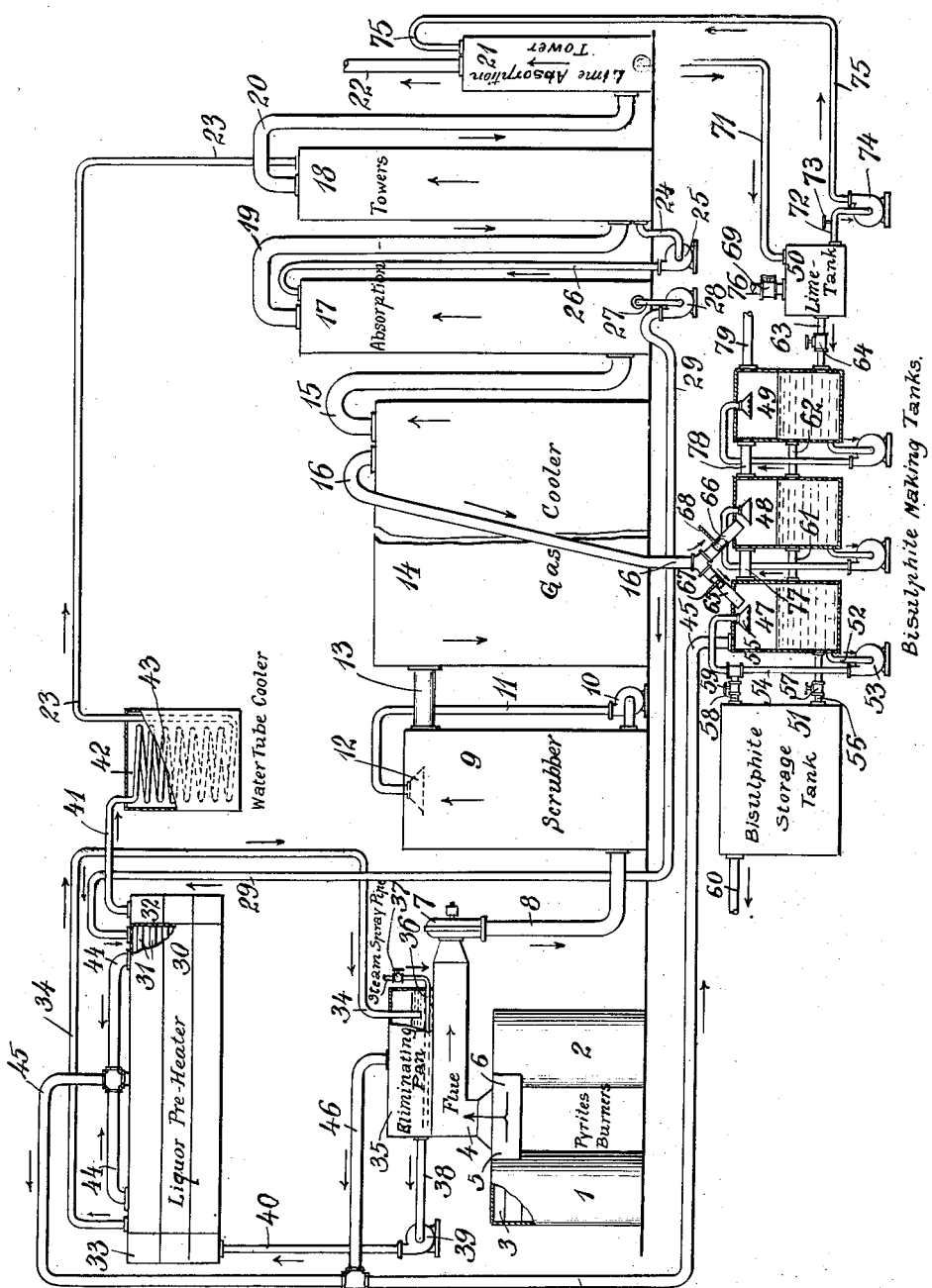

UNITED STATES PATENT OFFICE.

VIGGO DREWSEN, OF NEW YORK, N. Y.

PROCESS FOR UTILIZING PYRITES FOR BISULFITE-OF-LIME MANUFACTURE, &c.

981,625.   Specification of Letters Patent.   Patented Jan. 17, 1911.

Application filed December 9, 1909. Serial No. 532,237.

*To all whom it may concern:*

Be it known that I, VIGGO DREWSEN, a citizen of the United States, and resident of the borough of Brooklyn, county of Kings, city and State of New York, have made a certain new and useful Invention Relating to Processes for Utilizing Pyrites for Bisulfite-of-Lime Manufacture in Paper-Making, &c., of which the following is a specification, taken in connection with the accompanying drawing, forming part of the same.

This invention relates to a process for utilizing pyrites or other low grade sulfur material for manufacturing bisulfite liquors, such as bisulfite of lime or the like for use in connection with paper making. This may be effected, for example, by passing the sulfurous gases from the burning pyrites through absorption towers after scrubbing and cooling the same and passing the sulfurous liquor produced in said absorption towers through an evaporating pan heated by the freshly formed hot sulfurous gases from the pyrites to drive the concentrated sulfurous gases therefrom. The lime or bisulfite liquor may be passed successively through a series of bisulfite tanks while passing the weak sulfurous gases successively through a number of said tanks in the opposite direction to the flow of liquor therethrough and feeding the concentrated sulfurous gases into the first of said tanks to act upon the bisulfite liquor after absorption of the weaker gases.

The accompanying drawing shows in a diagrammatic way an illustrative embodiment of apparatus adapted for carrying out this invention.

In the illustrative form of apparatus shown in the drawing, one or more suitable burners, such as 1, 2, may be used for burning the pyrites or other sulfurous material, preferably with limited quantities of air so as to produce as concentrated sulfurous gases as possible. The burners may be in the form of McDougal furnaces provided with a plurality of shelves such as 3 and the sulfurous gases discharged from the burner passages 5, 6 may pass through the flue 4 into a suitable centrifugal fan or other blower 7 so as to be discharged through the passage 8 into a scrubber 9 of any desired form. As indicated, the scrubber may be arranged for a continuous circulation of the liquor which may be drawn by the rotary pump or other circulating device 10 from the lower part of the scrubber and forced through the pipe 11 and distributer 12 so as to be showered or sprayed down through the scrubber and remove the particles of impurities from the gases, this continuous circulation obviating waste of the sulfurous gases absorbed in the liquor which rapidly becomes saturated and cannot further absorb the gases. From the scrubber the sulfurous gases may pass through the passage 13 into a suitable gas cooler 14 of any desired construction where the gases may be cooled to the desired extent.

A portion of the sulfurous gases from the cooler which in the case of pyrites contain only about fourteen per cent. or so of sulfur dioxid may be taken in succession through suitable absorption devices, such for instance, as the vertical coke or absorption towers 17, 18. The gases from the cooler 13 may be conducted through the passage 15 into the tower 17 and thence through the passage 19 into the tower 18 from which they may be if desired led through the passage 20 into a final absorption device such as the lime absorption tower 21 for example, where practically all of the remaining sulfur dioxid may be absorbed therefrom for example by contact with the lime water or other alkaline liquor used in subsequent stages of the process as said lime liquor or other alkaline liquor passes over the distributing devices in the tower. The result is that the waste gases which are finally discharged from the discharge passage 22 may be made to contain so little sulfur dioxid as to be practically unobjectionable which also economizes loss of available sulfurous material in this way. In order to more effectively eliminate the last portions of the sulfur dioxid the fresh alkali used in forming the bisulfite may be passed through this final absorption tower by arranging a suitable circulation with the lime tank, such as 50. The alkali liquor may be taken from this tank through the pipe 72 in suitable quantities governed by the valve 73 and after passing through the rotary pump or circulating device 74 may be discharged by the pipe 75 into the top of the lime absorption tower 21. The liquor from the bottom of this tower may be led by a suitable pipe, such as 71, back into the alkali tank.

If desired, a continuous circulation of sulfurous liquor may be maintained through the absorption towers and concentrated sulfur dioxid driven therefrom by heat while the weak or exhausted sulfurous liquor, preferably after suitable cooling is returned and passed successively through the towers in the opposite direction to the flow of the sulfurous gases therethrough to become again charged with sulfur dioxid. This may be conveniently effected by the passing of water or weak sulfurous liquor through the pipe 23 into the top of the absorption tower 18 and taking the liquor from the bottom of this tower through the pipe 24 leading to the circulating pump 25 which forces it through the pipe 26 into the tower 17. Any desired liquid medium preferably of aqueous character which is capable of absorbing the weak sulfurous gases and allowing the same to be again eliminated therefrom may be used in this bisulfite liquor system and water may be effectively used for this purpose.

A suitable pipe, such as 27, may convey the sulfurous liquor from the tower 17 to the pump 28 which may force it through the pipe 29 to suitable devices for heating it and expelling the concentrated sulfurous gases therefrom. These heating devices may comprise a suitable heating or evaporating pan, such as the lead pan, 35, which may be heated by the hot sulfurous gases from the burners, so that a considerable portion of this heat of combustion is utilized in this way and at the same time the desired cooling of the sulfurous gases promoted to a corresponding extent. Additional heat may be supplied to the evaporating pan in any desired way as for instance by steam coils or pipes, such as a suitable perforated steam spray pipe 36, to which steam may be admitted in the desired quantities by the valve 37 governing the steam supply. The sulfurous gases driven off from the liquor in the pan 35 are of course rich in sulfur dioxid and may be advantageously used in connection with the weaker gases from the burning pyrites in securing the desired action on the alkali in making the bisulfite liquor for paper manufacture, and may also be similarly used in other operations where it is desired to most economically reinforce the weak sulfurous gases obtainable from the burning of pyrites or other low grade sulfur material. In order to further economize heat it is desirable to introduce any suitable preheater as of the "Liebig" type, for example, in the sulfurous liquor circulating system, as by leading the sulfurous liquor from the absorption towers through the pipe 29 into the jacket or the liquor preheater 30, the liquor issuing from the other end of the jacket through a suitable pipe, such as 34, and passing into the heating or evaporating pan 35 from which it may be taken through the pipe 38 and circulating device 39 discharging through the pipe 40 into the head 33 of the preheater. The liquor may then pass through the suitable circulating tubes 37 within the jacket and surrounded by the cool liquor therein so as to transfer a considerable portion of its heat thereto and drive off sulfurous gases therefrom before this liquor from the pan passes out through the pipe 41 connected with the opposite head 32. This liquor may be still further cooled as by passing it through the coil 43 of a suitable water tube or other cooler 42 so that the exhausted sulfurous liquor entering the absorption towers from the pipe 23 may be cooled to the desired extent.

The bisulfite system employed may comprise a series of any desired number of tanks, such as 47, 48, 49, through which the liquor may flow in succession in the production of the bisulfite of lime or other acid liquor which may be delivered into the storage tank 51 for utilization after it is discharged from the pipe 60. The pipe 56 may connect the bisulfite storage tank 51 with the first bisulfite tank 47, a suitable valve such as 57 controlling the flow of liquor therethrough and in the case of a spraying type of bisulfite tank such as diagrammatically illustrated the liquor may be taken by the pipe 52 and after passing through the pump 53 be discharged through the pipe 54 communicating with the storage tank through the branch 58 provided with the regulating valve 59 and also delivered through the spraying distributer 55 so as to be brought to the desired extent into contact with the gases in the tank. A similar circulating pump and connected distributer may of course be arranged in connection with the other bisulfite tanks and the pipe 61 may be used to connect the first tank 47 with the second tank 48 and a similar pipe 62 may allow the lime or bisulfite liquor to pass from the third tank 49. The lime liquor may of course be supplied to the lime tank through the pipe 76 provided with a valve 69 and pass therefrom into the last bisulfite tank of the series through the pipe 63 provided with the valve 64 which regulates the amount of bisulfite liquor treated. The weak sulfurous gases may be passed through a number of the bisulfite tanks in succession in the opposite direction to the flow of liquor therethrough by providing a suitable passage 16 from the gas cooler 14 having a connection 65 with the first bisulfite tank and the amount of gas entering the tank may be governed by a suitable valve, such as 67, in this gas passage. If desired also a similar gas connection 66 may lead to the second bisulfite tank and regulated amounts of the weak sulfurous gas admitted thereto as determined by the position of the valve 68 in this connection.

The concentrated sulfurous gases from the preheater may be taken through the passages 44, 45 into the first bisulfite tank in connection if desired with the concentrated gas from the pan 35 which enters the passage 46 connected with the passage 45. In this way the concentrated sulfurous gas which is rich in sulfur dioxid enters the first bisulfite tank 47 reinforcing the amount of weaker sulfurous gases which may be supplied thereto directly from the cooler or other part of the system so that the bisulfite liquor in this first tank which has been acted upon by the weaker gases with formation of sulfites is finally converted into bisulfite by these enriched gases which should have twenty per cent. or so of sulfur dioxid therein. The gases from the first tank 47 may pass through a suitable connecting passage 77 into the tank 48 to which it is desirable for some purposes to supply the larger proportion of the weaker sulfurous gases from the cooler by suitable regulation of the control valves 67, 68. The passage 78 serves to conduct the sulfurous gases from the tank 48 into the tank 49 and a similar passage 79 may discharge them therefrom.

It is of course understood that this invention has been disclosed in connection with a number of illustrative forms, proportions, arrangements of parts, portions and steps, to the details of which disclosure the invention is not of course to be limited, but

What is claimed as new and what is desired to be secured by Letters Patent is set forth in the appended claims.

1. The process of manufacturing bisulfite of lime for paper making which consists in burning pyrites, in cooling the resulting weak sulfurous gases, in absorbing most of the sulfur dioxid from a part of said sulfurous gases in continuously circulating aqueous sulfurous liquor, and then absorbing the remainder of the sulfur dioxid in said part of the sulfurous gases by means of lime water, in eliminating concentrated sulfurous gases from said sulfurous liquor by heat from the hot sulfurous gases from the burning pyrites, in circulating the lime or bisulfite liquor during its conversion, in supplying another portion of the weak sulfurous gases to the circulating bisulfite liquor and bringing said weak sulfurous gases into contact with and feeding the same along the bisulfite stream in the opposite direction to its direction of circulation and in causing the con entrated sulfurous gases eliminated from the sulfurous liquor to mix with said weak sulfurous gases and thereupon act on the bisulfite stream after action of said weaker sulfurous gases thereon.

2. The process of manufacturing bisulfite of lime for paper making which consists in burning pyrites and scrubbing and cooling the resulting weak sulfurous gases, in absorbing in water sulfur dioxid from a part of said sulfurous gases to form sulfurous liquor therefrom and absorbing the remaining sulfur dioxid from said part of the weak sulfurous gases by passing the same into contact with lime liquor, in driving off concentrated sulfurous gases rich in sulfur dioxid from said sulfurous liquor by the heat from the sulfurous gases from the pyrites, in circulating the lime or bisulfite liquor during its conversion, in bringing another portion of the weak cooled sulfurous gases into contact with the circulating stream of bisulfite liquor and passing the same along in the opposite direction to the direction of its circulation and in supplying the concentrated sulfurous gases driven off from the sulfurous liquor to mix with said weak sulfurous gases and thereupon act on the bisulfite liquor after action of said weaker sulfurous gases thereon and resultant absorption.

3. The process of manufacturing bisulfite which consists in burning low grade sulfurous material to produce weak sulfurous gases, in passing part of said weak sulfurous gases into contact with aqueous sulfurous liquor to cause absorption of sulfur dioxid thereby, in eliminating concentrated sulfurous gases from said sulfurous liquor, in circulating lime liquor or bisulfite liquor and simultaneously effecting its conversion, in bringing another part of the weak sulfurous gases into contact with the circulating bisulfite liquor and in supplying the concentrated sulfurous gases eliminated from the sulfurous liquor to mix with said weak sulfurous gases and thereupon act on the bisulfite liquor after action thereon and absorption thereby of said weaker sulfurous gases.

4. The process of manufacturing bisulfite which consists in burning low grade sulfurous material to produce weak sulfurous gases, in feeding part of said weak sulfurous gases into contact with aqueous sulfurous liquor for absorption of sulfur dioxid thereby, in eliminating concentrated sulfurous gases from said sulfurous liquor by heat from the weak sulfurous gases, in bringing other portions of the weak sulfurous gases into contact with bisulfite liquor simultaneously effecting its conversion and in causing the concentrated sulfurous gases eliminated from said sulfurous liquor to mix with said weak sulfurous gases and thereupon act on said bisulfite liquor.

5. The process of manufacturing bisulfite of lime which consists in producing and forming bisulfite from weak sulfurous gases which are incapable, by action on the lime or bisulfite liquor, of forming bisulfite of sufficient strength to be useful in paper making, in producing concentrated sulfurous gases from a portion of the weak sulfurous gases and mixing the same with another portion of said weak sulfurous gases and bringing the mixture into contact with the bisulfite liquor for action thereon after action thereon by weaker gases.

6. The process of manufacturing bisulfite which consists in producing and forming bisulfite from weak sulfurous gases which are incapable, by action on the lime or bisulfite liquor, of forming bisulfite of the desired strength, in producing concentrated sulfurous gases, in bringing weak sulfurous gases and a mixture of said weak sulfurous gases and of concentrated sulfurous gases into contact with said lime or bisulfite liquor during its conversion to finally subject said bisulfite liquor to reinforced sulfurous gases to effect its desired conversion.

7. The process of manufacturing bisulfite which consists in producing weak sulfurous gases, in producing from a portion thereof concentrated sulfurous gases, in bringing another portion of said weak sulfurous gases into contact with circulating bisulfite liquor and in bringing a mixture of said weak sulfurous gases and of said concentrated sulfurous gases into contact with said bisulfite liquor after action of weaker gases thereon to finally subject said bisulfite liquor to the action of reinforced sulfurous gases to effect its desired conversion.

8. The process of manufacturing bisulfite which consists in producing hot weak sulfurous gases, in subjecting part of said weak sulfurous gases to the absorbing action of aqueous sulfurous liquor, in eliminating concentrated sulfurous gases from said sulfurous liquor by heat from said hot weak sulfurous gases, in bringing a portion of the weak sulfurous gases into contact with lime liquor to form bisulfite liquor and in bringing a mixture of the weak sulfurous gases and of the concentrated sulfurous gases into contact with said bisulfite liquor to complete its conversion.

VIGGO DREWSEN.

Witnesses:
HARRY L. DUNCAN,
JESSIE B. KAY.